Nov. 22, 1949 W. R. BECK 2,488,520
DRIVEN WHEEL SUSPENSION FOR MINE CARS
Filed June 4, 1945 5 Sheets-Sheet 2
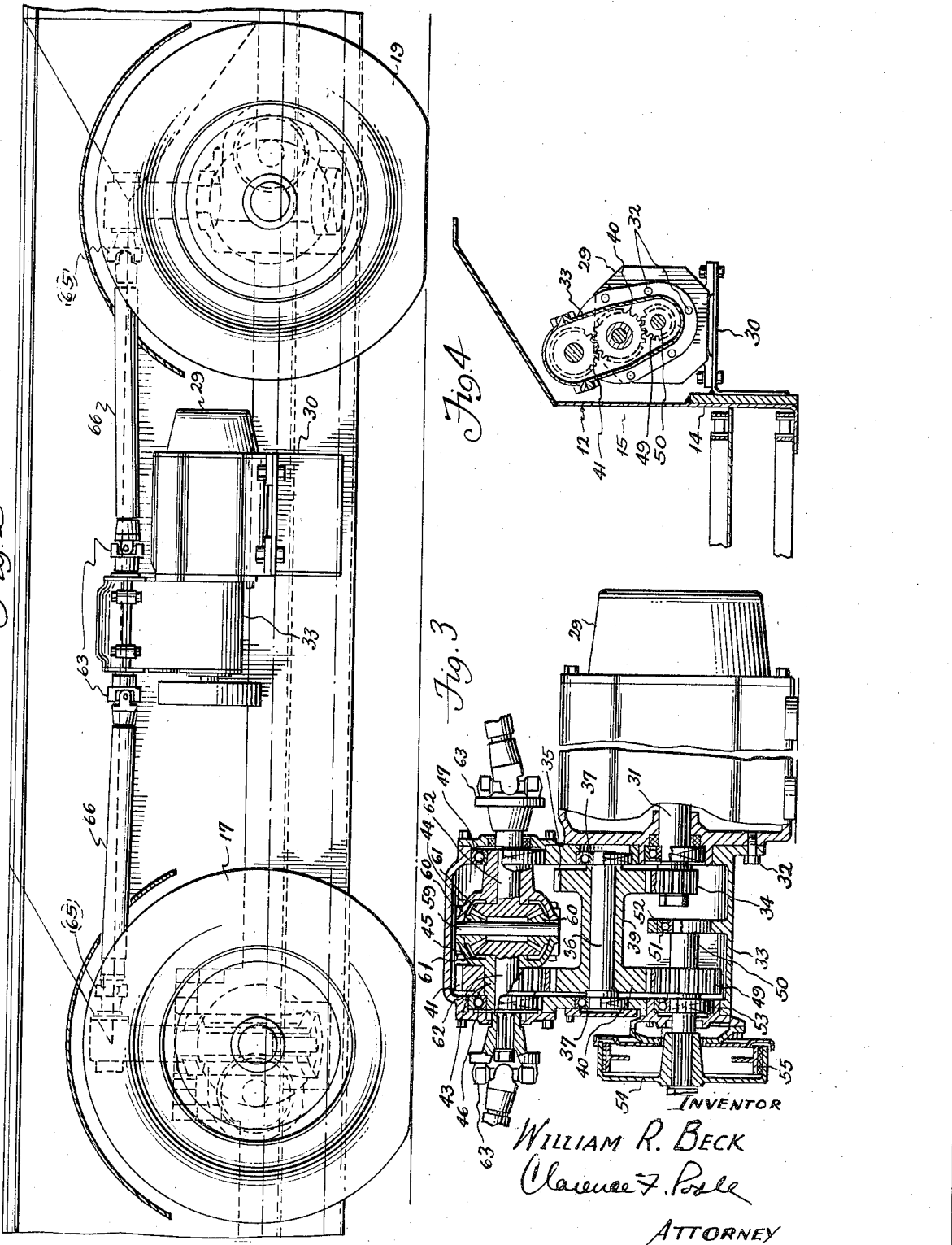
INVENTOR
WILLIAM R. BECK
Clarence F. Poole
ATTORNEY

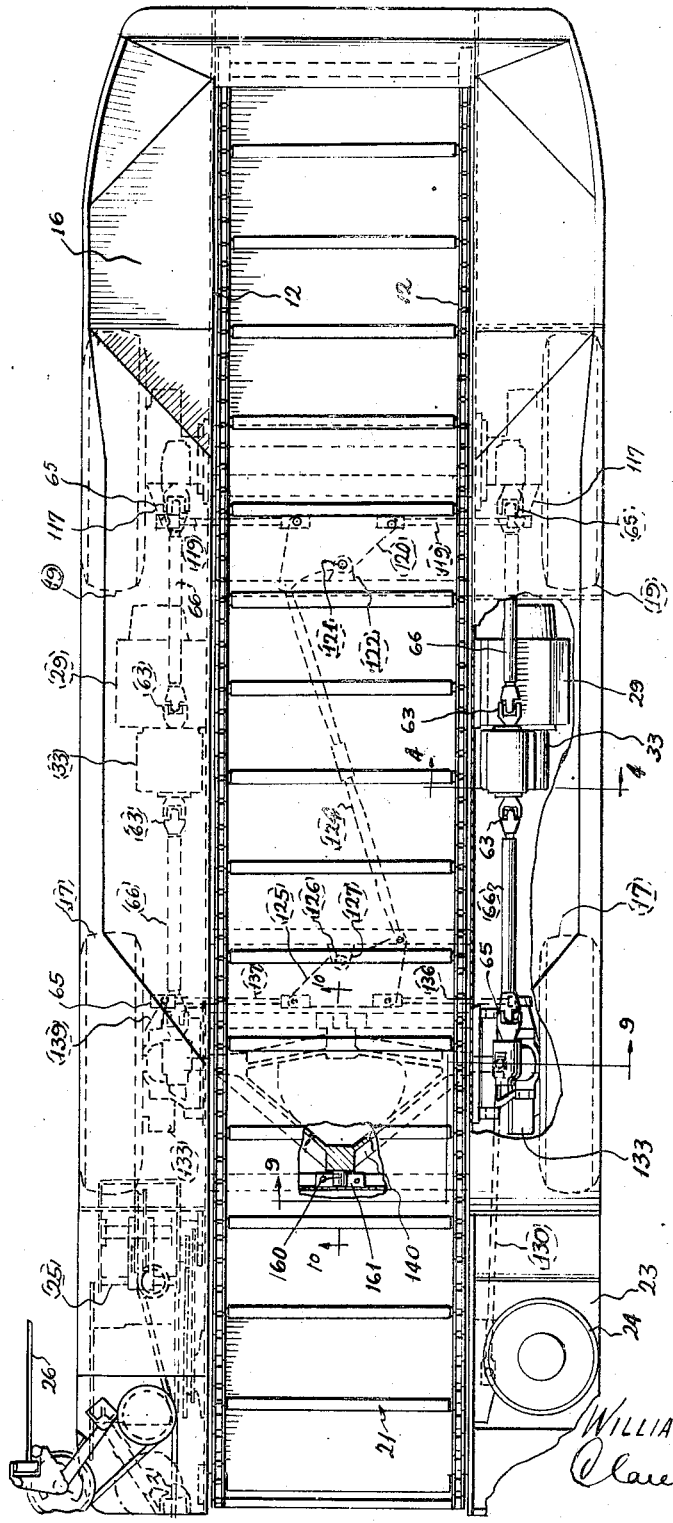

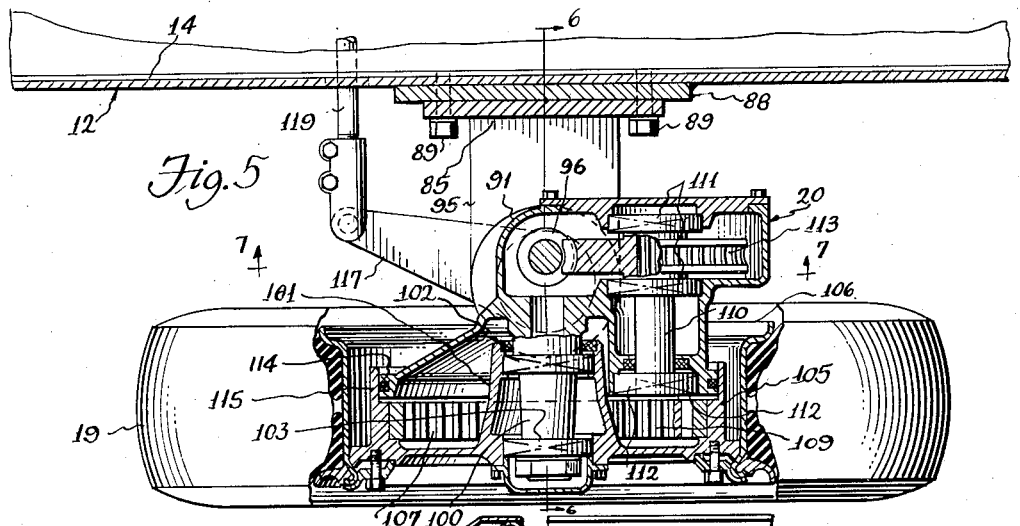
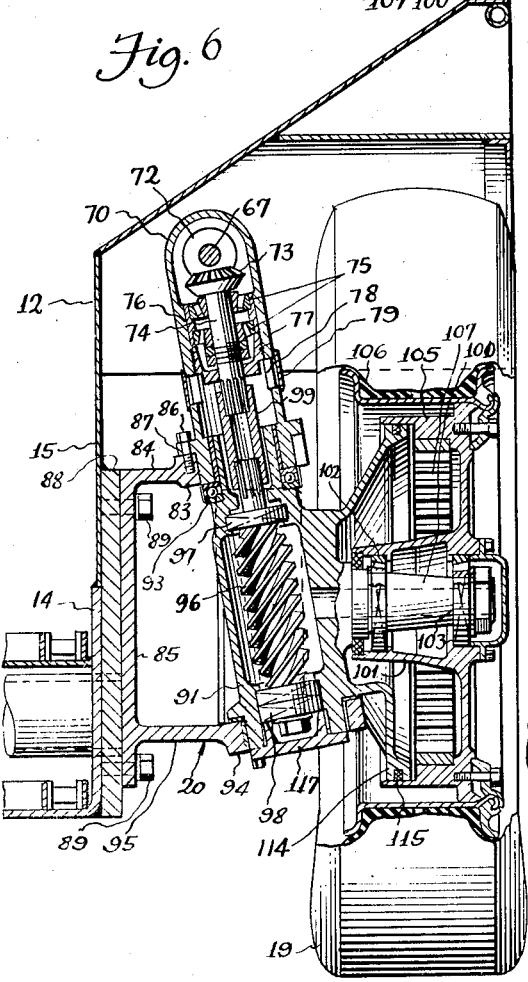
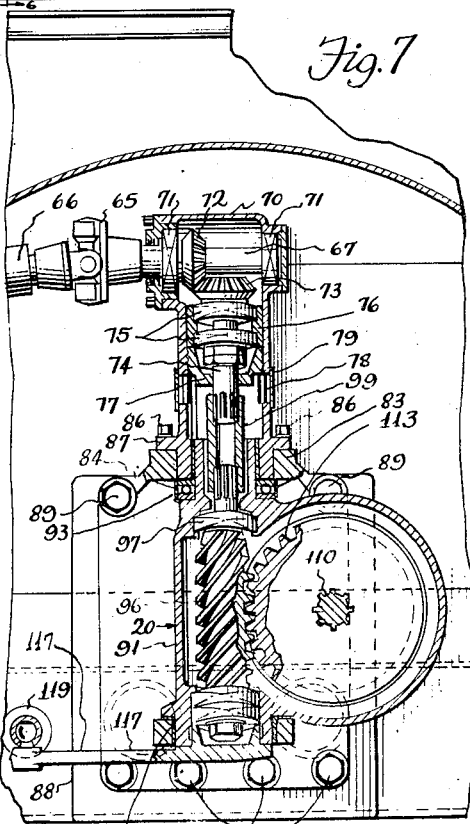

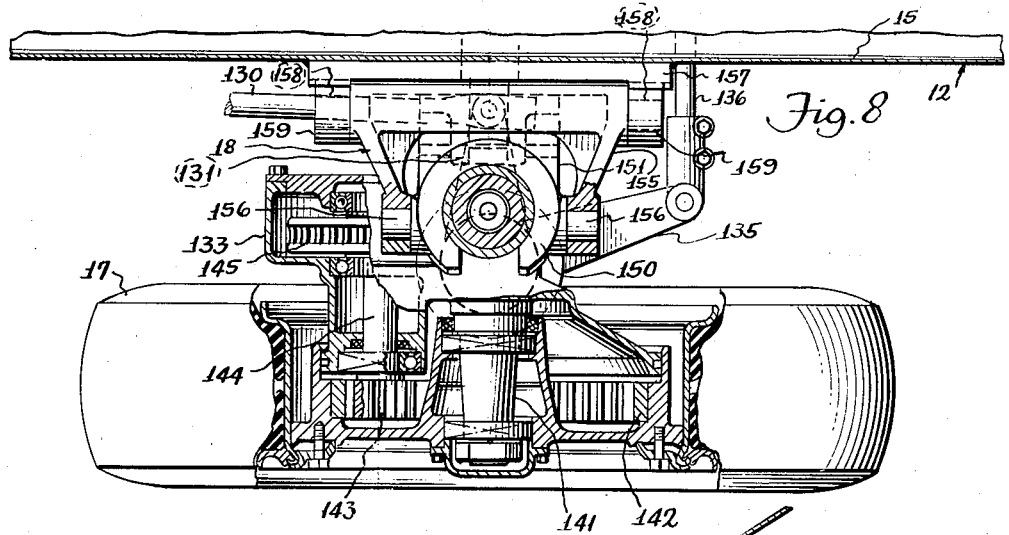
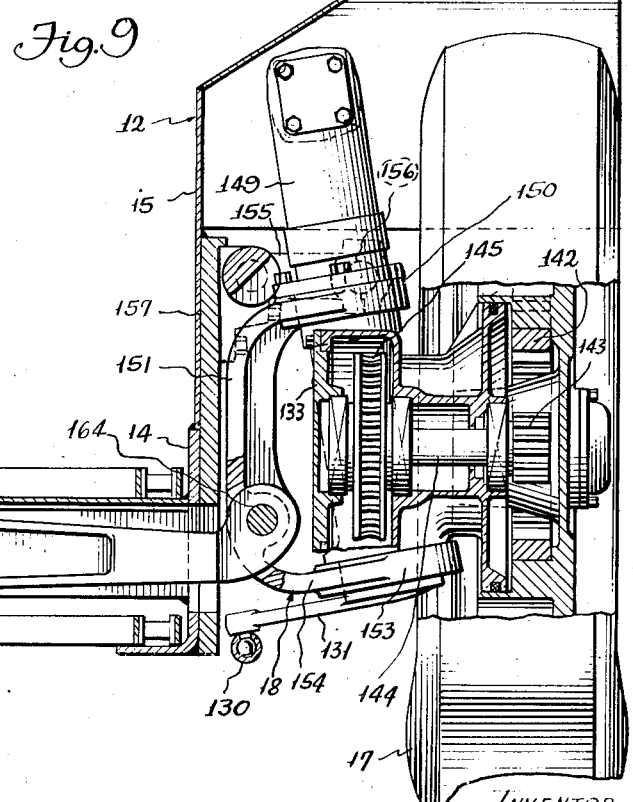

Nov. 22, 1949 W. R. BECK 2,488,520
DRIVEN WHEEL SUSPENSION FOR MINE CARS
Filed June 4, 1945 5 Sheets-Sheet 5

INVENTOR
WILLIAM R. BECK
Clarence F. Poole
ATTORNEY

Patented Nov. 22, 1949

2,488,520

UNITED STATES PATENT OFFICE 2,488,520

DRIVEN WHEEL SUSPENSION FOR MINE CARS

William R. Beck, Chicago, Ill., assignor to Goodman Manufacturing Company, Chicago, Ill., a corporation of Illinois Application June 4, 1945, Serial No. 597,547

4 Claims. (Cl. 180—43)

This invention relates to improvements in coal mine haulage vehicles of the kind used for transporting coal underground from the working face of a mine to a main loading station thereof.

The principal objects of the invention are to provide a slow speed large capacity haulage vehicle for transporting coal in mines underground, having an improved structure for mounting the wheels of the vehicle on the body thereof so all four wheels may be used for steering and propelling the vehicle, together with a simplified form of support and drive means for said wheels including a drive motor mounted on each side of the vehicle with novel and efficient independent drive connections from each motor to each set of front and rear wheels of the vehicle.

A more specific object of my invention is to provide a drive through the king pin of each vehicle wheel which includes gear housings forming the king pins for the vehicle wheels and having worms mounted therein coaxial with the turning axis thereof, and forming driving means for their associated vehicle wheels.

These and other objects of my invention will more clearly appear from time to time as the following specification proceeds and with reference to the accompanying drawings wherein:

Figure 1 is a top plan view of a vehicle constructed in accordance with my invention;

Figure 2 is an enlarged fragmentary view of the vehicle in side elevation;

Figure 3 is an enlarged fragmentary detail view in side elevation of one of the drive motors and the drive gearing driven thereby, with certain parts broken away and certain other parts shown in longitudinal section in order to show certain details of the drive from one of the vehicle drive motors to the wheels of the vehicle;

Figure 4 is a fragmentary transverse sectional view taken substantially along lines 4—4 of Figure 1, but drawn to substantially the same scale as Figure 2, and showing certain details of the geared reduction drive from one of the drive motors of the vehicle;

Figure 5 is an enlarged fragmentary plan view of one of the rear vehicle wheels, with certain parts broken away and certain other parts shown in horizontal section in order to show certain details of the drive therefor;

Figure 6 is a fragmentary transverse sectional view taken substantially along line 6—6 of Figure 5;

Figure 7 is a fragmentary longitudinal sectional view taken substantially along line 7—7 of Figure 5;

Figure 8 is an enlarged fragmentary plan view of one of the front vehicle wheels, with certain parts thereof broken away and certain other parts shown in horizontal section in order to show certain details of the support mounting and drive connection thereto;

Figure 9 is a fragmentary sectional view taken substantially along line 9—9 of Figure 1;

Figure 10:
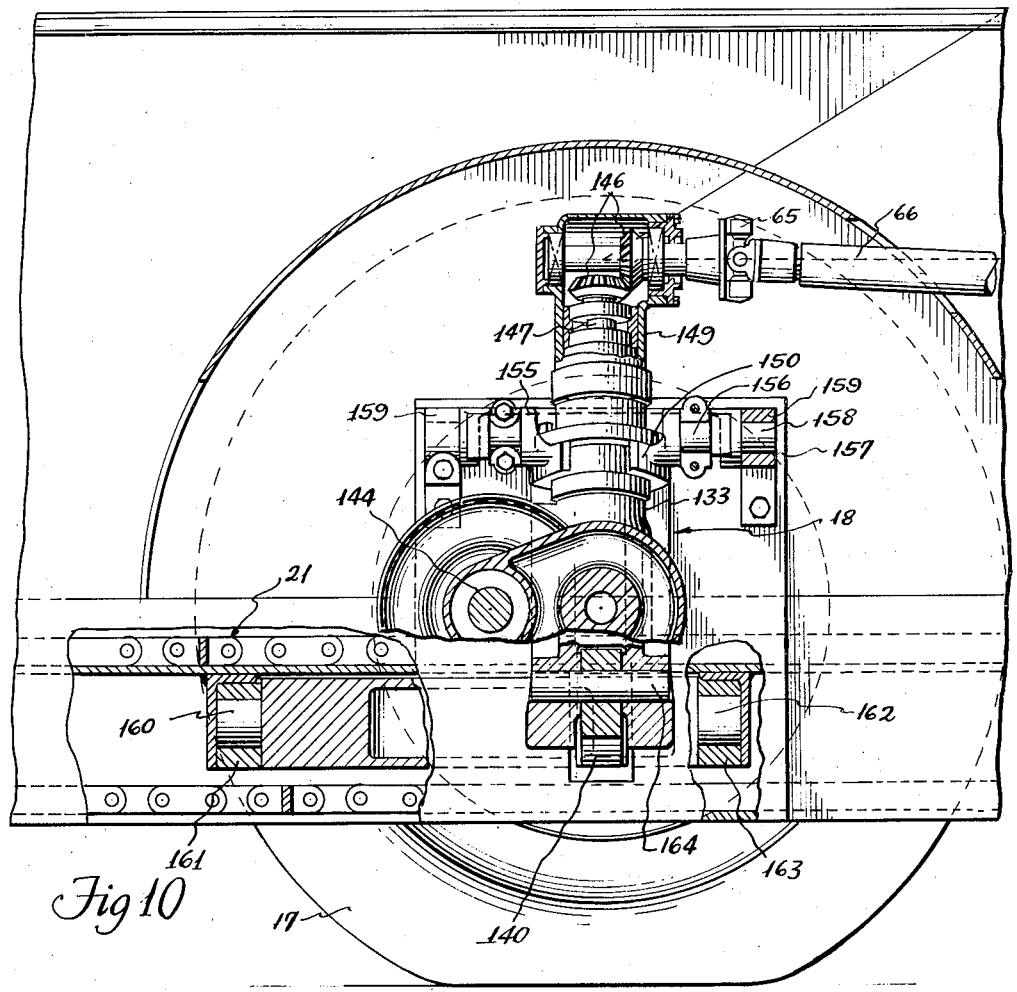
Figure 10 is a fragmentary sectional view taken substantially along line 10—10 of Figure 1.
Figure 11:
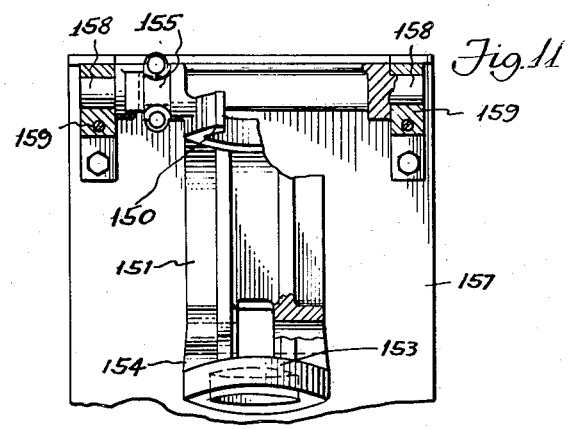
Figure 11 is an enlarged detail fragmentary side view showing certain details of the support mounting for one of the front vehicle wheels.

Referring now to the details of the embodiment of my invention illustrated in the drawings, the vehicle comprises an elongated chassis including a pair of vertically disposed laterally spaced side walls 12, 12 extending the full length thereof and forming the side walls of a coal carrying compartment thereof. Each of said side walls forms a supporting side beam for the vehicle and consists generally in a relatively heavy plate 14 forming the lower portion thereof, with a lighter plate 15 welded thereto and extending upwardly therefrom, as shown in Figures 4, 6 and 9.

The side walls 12, 12 at the extreme front part of the vehicle extend vertically for their entire height. The portion of said side walls adjacent and just rearwardly of the front vehicle wheels flares outwardly over said wheels, to increase the material carrying capacity of the vehicle, and the portion of said side walls adjacent the rear portion of the vehicle is formed in the shape of a hopper 16, to permit ready loading of the car by the discharge boom of a loading machine. Said hopper and the general arrangement of the vehicle are similar to that shown and described in a prior application Serial No. 535,903, filed by me on May 17, 1944, now Patent No. 2,399,619 issued May 7, 1946, and forms no part of my present invention so that it is not herein shown or described in detail.

The vehicle has two front rubber tired driving and steering wheels 17, 17 near its front end, mounted on pivotal equalizing axle structures 18, 18 which will hereinafter be more fully described. Two rear rubber tired driving and steering wheels 19, 19 are disposed near the rear end of the vehicle and are mounted on pivotal axle structures 20, 20. Said front and rear pivotal axle structures will hereinafter be more fully described as this specification proceeds.

An endless chain flight conveyor indicated generally at 21 extends along the vehicle for its full length and forms the bottom of the coal carrying compartment thereof, so that the coal can be progressed towards the discharge or front end of the vehicle during the loading operation, and can be unloaded mechanically from the discharge end of the vehicle, in the usual manner. An operator's platform 23 bearing the usual vehicle control devices including a steering wheel 24, is provided at the left-hand forward corner of the vehicle, outside of one of the upright side walls 12 and forward of the adjacent front steering and drive wheel 17, as shown in Figure 1.

A cable reel indicated generally by reference character 25 is provided at the opposite side of the vehicle from said operator's platform on the outside of the side wall 12. Said cable reel has an electric cable 26 adapted to be wound thereon or be payed off therefrom in the usual manner, for supplying electric power to the vehicle when the free end of said cable is connected to a source of power.

The mechanism for driving each set of front and rear vehicle wheels 17 and 19 includes an electric motor 29 mounted on the outer side of each side wall 12 on a supporting bracket 30, secured to said side wall and extending laterally therefrom, as shown in Figures 2 and 4. Each of said motors is herein shown as being a well known form of electric motor, and the drive therefrom to the respective front and rear vehicle wheels 17 and 19 is the same for each wheel, so the drive from one motor only to its rear drive and steering wheel will herein be shown and described in detail.

The motor 29 has an armature shaft 31, which extends into a gear housing 33, herein shown as being secured to the forward end of said motor, as by cap screws 32, and projecting longitudinally forwardly therefrom (see Figure 3). An armature pinion 34, keyed on said armature shaft, meshes with and drives a spur gear 35 mounted on a longitudinally extending shaft 36, journaled at its ends in the front and rear side walls of said gear housing on ball bearings 37, 37. Said spur gear is herein shown as being formed integrally with a sleeve 39. A spur gear 40 is also formed integrally with said sleeve at the end thereof opposite from said spur gear 35. Said spur gear 40 meshes with and drives a spur gear 41 mounted on the hub 43 of a casing 44 for a differential 45. Said hub is journaled in the forward end of said gear housing 33 on a ball bearing 46. The opposite end of said casing for said differential is journaled in the rear end wall of said housing on a ball bearing 47.

The spur gear 40 also meshes with a spur gear 49 herein shown as being keyed on a longitudinally extending shaft 50, disposed beneath the shaft 36 and journaled at its inner end in a ball bearing 51, mounted in a bearing support member 52, projecting upwardly from the bottom of the housing 33. Said shaft is journaled in the forward end wall of said housing on a ball bearing 53 and projects forwardly therefrom. A brake drum 54 is herein shown as being splined on the end of said shaft. The inner periphery of said brake drum is adapted to be engaged by a brake shoe 55 for braking the front and rear wheels on one side of the vehicle. Said brake drum and shoe and the means for engaging said brake shoe with said brake drum may be of any well known form and are not herein shown or described in detail since they form no part of my present invention.

The differential 45 is of a well known construction and its casing has a shaft 59 mounted therein at its ends and extending transversely of the axis of rotation of said casing. A pair of facing bevel pinions 60, 60 are freely mounted on said shaft within said casing adjacent opposite sides thereof and mesh with facing bevel gears 61, 61 herein shown as being formed integrally with longitudinal shafts 62, 62 journaled within said casing and projecting forwardly and rearwardly from the forward and rear ends of the gear housing 33. Each of said shafts is adapted to drive a vehicle wheel through universal joints 63, 63 splined on said shafts and connected with longitudinally spaced universal joints 65, 65 through extensible shafts 66, 66. Said universal joints and the drive connections therebetween through said extensible shafts may be of any well known form and are no part of my present invention so are not herein shown or described in detail.

The rear universal joint 65 has driving connection with a longitudinal shaft 67 journaled at opposite ends of a gear housing 70 on ball bearings 71, 71. A bevel gear 72 is keyed on said shaft and meshes with and drives a bevel gear 73 keyed on the upper end of an upright shaft 74, journaled within said housing on a pair of vertically spaced radial thrust bearings 75, 75. Said radial thrust bearings are herein shown as being mounted in a sleeve 76 mounted within said gear housing 70 and retained therein by means of a threaded retaining sleeve 77. Access to said threaded retaining sleeve is provided through slotted openings 78, 78 provided in said housing and closed by means of a cover 79.

The lower end of the gear housing 70 extends within and is secured to a boss 83 open at its outer end and formed on an upper arm 84 of a wheel supporting bracket 85. The upper end of a worm gear housing 91 is journaled in said gear housing 70 and forms a king pin or knuckle support for the rear axle supporting structure 20. Said gear housing is secured to said boss 83 by means of cap screws 86, 86 extending through a flanged portion 87 of said gear housing and threaded within said boss 83. Said bracket 85 extends along and abuts a reinforcing plate 88 for the side wall 12 at its inner end, and is secured to said reinforcing plate by means of cap screws 89, 89.

The vertical thrust between the housing 70 and the worm gear housing 91 is taken by means of a ball thrust bearing 93 interposed between a shouldered portion of said worm gear housing and the inner end of said housing 70. Said worm gear housing extends in the same axial direction as the shaft 74, and said shaft and worm gear housing are disposed at an angle with respect to the vertical, inclined so that its upper end extends inwardly towards the side wall 12, to provide ease in steering the associated vehicle wheel. Said worm gear housing is journaled at its lower end in a boss 94 open at its outer end and formed integrally with the outer end of a lower outwardly extending arm 95 of the bracket 85.

A worm 96 coaxial with the longitudinal axis of the shaft 74 is journaled in the worm gear housing 91 on an anti-friction bearing 97, mounted adjacent the upper end of said housing, and on anti-friction bearings 98, 98 mounted adjacent the lower ends of said housing. A coupling member 99 connects said shaft with said worm, for driving said worm from said shaft.

A dead axle 100 is herein shown as extending from said worm gear in a generally horizontal direction and as having a hub 101 of the rear drive and steering wheel 19 journaled thereon, on anti-friction bearings 102, 103. Said wheel may be of any well known form and includes a flange 105 extending inwardly from the web thereof, having a rim 106 mounted thereon for detachably mounting a rubber tire.

An internal gear 107 is secured to the inside of the flange 105 and is meshed with and driven from a spur pinion 109 on the outer end of a transverse shaft 110. Said shaft is journaled in said worm gear housing on spaced anti-friction bearings 111, 111 and 112, as may be seen with reference to Figure 5. A worm gear 113, herein shown as being splined on said shaft, is driven from the worm 96. Since the worm gear 113 rotates about a horizontal axis and the worm rotates about the axis of the king pin which is at an angle extending transversely of the worm gear, the teeth of said worm are cut at such an angle as to mesh with and drive said worm gear when inclined transversely with respect to said worm, in a manner well known to those skilled in the art. This provides an efficient drive through the king pin and enables the king pin to be inclined at the proper king pin angle for easy steering, for driving the wheels 19, 19 from the motors 29, 29 when steering the vehicle, in all positions of said wheels with respect to their supporting brackets 95, 95.

The worm gear housing 91 has a drum 114 extending within the flanged portion 105 of said wheel. A packing member 115 is mounted in the outer periphery of said drum and engages the inside of said flanged portion, to retain oil within the flanged portion of said wheel to lubricate the spur gears 107 and 109 and the bearings therefor.

The rear wheels are turned for steering by means of lever arms 117, 117 secured to the lower ends of the worm gear housings 91, 91, for turning said housing and the wheels 19, 19 about the axes of the worms 96, 96. Said lever arms project angularly forwardly and inwardly from said housing and are connected together by means of tie rods 119, 119 pivotally connected to the forward ends of said lever arms. Said tie rods are pivotally connected at their inner ends to opposite sides of a rocking member 120, which is pivotally mounted intermediate the side walls of the vehicle on a vertical shaft 121, mounted in a bracket 122, on the bottom of the vehicle.

The rocking member 120 is pivoted, to turn the lever arms 117, 117, by means of a link 124, connected to the right-hand forward corner thereof and extending forwardly therefrom angularly across the bottom of the vehicle to a similar rocking member 125, to which it is pivotally connected. Said rocking member 125 is pivoted intermediate the side walls of the vehicle on a vertical shaft 126 mounted in a bracket 127. Movement of said last mentioned rocking member is controlled by means of the steering wheel 24 in the operator's compartment 23.

The operative connection from the steering wheel 24 to the rocking member 125 includes a well known form of steering gear operatively connected with a drag link 130. Said steering gear is not herein shown or described in detail since it is no part of my present invention. Said drag link is pivotally connected at its rear end with a lever arm 131 secured to the lower end of a worm and worm gear housing 133, which forms a king pin or steering knuckle for supporting the left front steering wheel 17. A lever arm 135 extends rearwardly and angularly inwardly from the lower end of said worm and worm gear housing, and has a tie rod 136 pivotally connected to its free end, the opposite end of which tie rod is pivotally connected to the rocking member 125. A similar tie rod 137 operatively connects said rocking member with the right-hand steering and drive wheel 17 through a lever arm 139 connected with the lower end of the worm and worm gear housing 133 which forms a knuckle support, for supporting the right-hand steering wheel. Thus, upon turning movement of the steering wheel 24, the drag link 130 will turn the left front steering and drive wheel 17 through the lever arm 131, and the lever arm 135 will simultaneously pivot the rocking member 125 and turn the right front steering and drive wheel through the tie rod 137, and also turn the rear steering and drive wheels at the same time, through the link 124 and rocking member 120.

The equalizing axle structures 18, 18 each include the worm and worm gear housings 133, 133, which are mounted on the side walls of the vehicle for floating movement in a vertical direction and which are connected together adjacent their lower ends by a transverse equalizing bar 140, pivotally connected to the underside of the vehicle, for movement about a longitudinal axis parallel with the longitudinal center of said vehicle. Said equalizing axle structures are the same for each side of the vehicle so the equalizing axle structure on the right-hand side of the vehicle only need herein be shown and described in detail.

The worm and worm gear housing 133 has an axle 141 extending outwardly therefrom and forming a dead axle for the front steering wheel 17. An internal gear 142 driven by a pinion 143 is provided for driving said wheel. Said pinion is on the outer end of a shaft 144, journaled in said worm and worm gear housing and driven from a worm and worm gear drive indicated generally by reference character 145. The drive to said worm and worm gear drive from the forward universal coupling 65 is similar to the drive to the rear worm gear 113 and includes a pair of meshing bevel gears 146, 146, the driven gear of which is on the upper end of an upright shaft 147. Said upright shaft is journaled in a gear housing 149 and has drive connection with the worm of said worm and worm gear drive in the same manner the upright shaft 74 has drive connection with the worm 96, so said drive connection need not herein be shown or described in detail. The gear housing 149 is secured to a boss 150 open at its outer end and formed integrally with the upper outwardly projecting end of a floating support bracket 151. The upper end of the worm and worm gear housing 133 is journaled in the lower end of said gear housing 149 in the same manner the worm and worm gear housing 91 is journaled in the lower end of the housing 70, and the lower end of said worm and worm gear housing is journaled for pivotal movement about an axis coaxial with the axis of the shaft 147, in a boss 153 formed integrally with an outwardly extending lower portion 154 of the floating support bracket 151. Said worm and worm gear housing and shaft 147 are inclined inwardly towards the side wall of the vehicle at the same angle as the worm and worm gear housing 91 and shaft 74, to provide the proper king pin angle to lessen the resistance of the tires against the ground during turning of the wheels 17, 17 for steering.

The equalizing support bracket 151 is pivotally connected adjacent the forward end of the boss 150 on opposite sides of said boss to the forward end of a yoke 155, by means of pivot pins 156, 156. The inner end of said yoke is pivotally connected to a reinforcing plate 157, herein shown as being welded to the outer side of the side wall 12. The pivotal connection between said yoke and said reinforcing plate includes a pair of pivot pins 158, 158 extending from opposite sides of said yoke and pivotally mounted in longitudinally spaced brackets 159, 159, secured to and projecting outwardly from said reinforcing plate. The outer left-hand end of the equalizing bar 140 extends within a slotted portion formed in the lower inner end of said floating support bracket and is pivotally connected thereto by means of a pivotal pin 164. The opposite end of said equalizing bar is pivotally connected in a like manner to the opposite floating support bracket for the worm and worm gear housing 133 for the right-hand steering and drive wheel.

The equalizing bar 140 is herein shown as being of a substantially triangular formation to lend rigidity thereto. The apex of the triangle forming said bar extends along the longitudinal center line of the vehicle, as shown in Figure 1. A pivot pin 160 is herein shown as being formed integrally with and extending forwardly from the apex of the triangle forming said bar. Said pivot pin is journaled in a support bracket 161 mounted on the underside of the material carrying compartment of the vehicle and depending therefrom. A similar coaxial pivot 162 extends rearwardly from the base of the triangle forming said equalizing bar, and is pivotally mounted in a bracket 163 secured to the underside of the material carrying compartment of the vehicle. The axes of said pivot pins 160 and 162 are parallel with the longitudinal axis of the vehicle and mount said equalizing bar for pivotal movement about a longitudinal axis extending through the center of the vehicle. Thus when the vehicle is traveling over a rough bottom and one front wheel rides into a depression, the opposite front wheel will be moved in an upward direction by said equalizing bar and vice versa when one front wheel engages a rise in the ground. The front wheels are thus held in engagement with the ground where it is rough, enabling the vehicle to readily travel over an uneven mine bottom and minimizing twisting of the vehicle frame, and still providing relatively smooth riding qualities for the vehicle, without the use of springs.

While I have herein shown and described one form in which my invention may be embodied, it will be understood that the construction thereof and the arrangement of the various parts may be altered without departing from the spirit and scope thereof. Furthermore, I do not wish to be construed as limiting my invention to the specific embodiment illustrated, excepting as it may be limited in the appended claims.

I claim as my invention:

1. In a drive and steering wheel assembly, particularly adapted for use on an open ended vehicle operable in confined spaces and having vertical side walls, a bracket adapted to be secured to a side wall of the vehicle, a vehicle driving and steering wheel, a king pin mounting said wheel on said bracket including a gear housing having a shaft projecting therefrom and forming a support for said wheel, said gear housing being journaled adjacent its upper and lower ends in said bracket and having a worm journaled therein for rotation about an axis coaxial with the turning axis of said king pin, a worm gear, driven by said worm, journaled in said housing for rotation about a horizontal axis, and a spur gear reduction between said worm gear and wheel.

2. In a drive and steering wheel assembly, particularly adapted for use on an open ended vehicle operable in confined spaces and having vertical side walls, a bracket adapted to be secured to a side wall of the vehicle, a vehicle driving and steering wheel, a king pin mounting said wheel on said bracket including a gear housing having a shaft projecting therefrom and forming a support for said wheel, said gear housing being journaled adjacent its upper and lower ends in said bracket and having a worm journaled therein for rotation about an axis coaxial with the turning axis of said king pin, a worm gear driven by said worm, a transverse shaft journaled in said housing and having said worm gear mounted thereon, a spur pinion on said shaft, and an internal gear mounted within the lateral limits of said wheel and driven by said spur pinion.

3. In a drive and steering wheel assembly, particularly adapted for use on an open ended vehicle operable in confined spaces and having vertical side walls, a bracket adapted to be secured to a side wall of the vehicle and having vertically spaced bearing support bosses adjacent its upper and lower ends, a vehicle driving and steering wheel, a king pin mounting for said wheel in said bosses and including a gear housing journaled adjacent its upper and lower ends in said bosses and having a dead shaft projecting therefrom intermediate said bosses and forming a support for said wheel, said gear housing having a worm journaled therein for rotation about an axis coaxial with the axis of turning movement of said housing with respect to said bracket and having a worm gear, driven by said worm, journaled therein for rotation about a horizontal axis, an internal gear mounted within said wheel for driving said wheel, and a spur pinion driven by said worm gear and driving said internal gear.

4. In a drive and steering wheel assembly, particularly adapted for use on an open ended vehicle operable in confined spaces and having vertical side walls, a bracket adapted to be secured to a side wall of the vehicle, a vehicle driving and steering wheel, a king pin mounting said wheel on said bracket including a gear housing having a dead shaft projecting therefrom and having said wheel journaled thereon, an internal gear mounted within the lateral limits of said wheel, a pinion meshing therewith for driving said internal gear and wheel, a worm gear rotatable about a horizontal transverse axis for driving said pinion, said bracket having vertically spaced bearing bosses adjacent its upper and lower ends having said gear housing journaled therein for pivotal movement about an upright axis, and a worm journaled in said gear housing for rotation about said upright axis and meshing with and driving said worm gear in all positions of said wheel about said upright axis.

WILLIAM R. BECK.

REFERENCES CITED

The following references are of record in the file of this patent:

UNITED STATES PATENTS

| Number | Name | Date |
|---|---|---|
| 1,306,227 | Kane | June 10, 1919 |
| 1,883,357 | Fageol | Oct. 18, 1932 |
| 2,105,553 | Schroter et al. | Jan. 18, 1938 |
| 2,212,453 | Perkins | Aug. 20, 1940 |
| 2,336,386 | Beck | Dec. 7, 1943 |
| 2,338,160 | Arentzen | Jan. 4, 1944 |
| 2,346,123 | Willson | Apr. 4, 1944 |
| 2,357,742 | Jeffrey | Sept. 5, 1944 |
| 2,362,636 | Joy | Nov. 14, 1944 |
| 2,395,333 | Lee | Feb. 19, 1946 |